US012659383B2

(12) United States Patent
Salpekar et al.

(10) Patent No.: US 12,659,383 B2
(45) **Date of Patent: \*Jun. 16, 2026**

(54) SYSTEM AND METHODS FOR EFFECTIVELY ADDRESSING FAST-PRODUCER AND SLOW-CONSUMER PROBLEM FOR PERSISTENT HYBRID CLOUD CACHES

(71) Applicant: Egnyte, Inc., Mountain View, CA (US)

(72) Inventors: Ajay Salpekar, Mountain View, CA (US); Bhaskar Guthikonda, Mountain View, CA (US)

(73) Assignee: Egnyte, Inc., Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/228,997

(22) Filed: Aug. 1, 2023

(65) Prior Publication Data

US 2023/0412703 A1 Dec. 21, 2023

Related U.S. Application Data

(63) Continuation of application No. 17/167,824, filed on Feb. 4, 2021, now Pat. No. 11,765,251.

(60) Provisional application No. 62/970,198, filed on Feb. 5, 2020.

(51) Int. Cl.
| | |
|---|---|
| *H04L 67/568* | (2022.01) |
| *G06F 16/17* | (2019.01) |
| *G06F 16/18* | (2019.01) |
| *H04L 67/06* | (2022.01) |
| *H04L 67/1097* | (2022.01) |
| *H04L 67/306* | (2022.01) |

(52) U.S. Cl.
CPC ........ *H04L 67/568* (2022.05); *G06F 16/1734* (2019.01); *G06F 16/1815* (2019.01); *H04L 67/06* (2013.01); *H04L 67/1097* (2013.01); *H04L 67/306* (2013.01)

(58) Field of Classification Search
CPC . H04L 67/2842; H04L 67/06; H04L 67/1097; H04L 67/306; G06F 16/1734; G06F 16/1815
USPC ........................................ 709/203
See application file for complete search history.

(56) References Cited

U.S. PATENT DOCUMENTS

| | | | |
|---|---|---|---|
| 2012/0221684 A1* | 8/2012 | Ferris ...................... | H04L 67/56 |
| | | | 709/217 |
| 2017/0208052 A1* | 7/2017 | Jai .......................... | H04L 63/08 |

\* cited by examiner

*Primary Examiner* — Zi Ye
(74) *Attorney, Agent, or Firm* — Pierson Ferdinand, LLC; Jeffrey R. Ambroziak

(57) ABSTRACT

A system for effectively addressing the fast-producer and slow-consumer problem for persistent hybrid cloud caches. In particular, the system and associated methods ensure the integrity of data stored by persistent caches by utilizing a plurality of journals, including a user journal and a cloud journal. The user journal records operations conducted by users of the system in records. Before the records are transferred to a cloud storage system, the records are transferred to the cloud journal, which may be configured to be larger than the user journal. Once a record is transferred from the user journal to the cloud journal, the record may be released from the user journal, thereby increasing capacity of the user journal for subsequent operations to be recorded. Each record may then be transferred to the cloud storage system from the cloud journal, which may then cause each record to be released from the cloud journal.

20 Claims, 5 Drawing Sheets

200

222     212     224

202     204     206

208

210     214     216     218     220

400

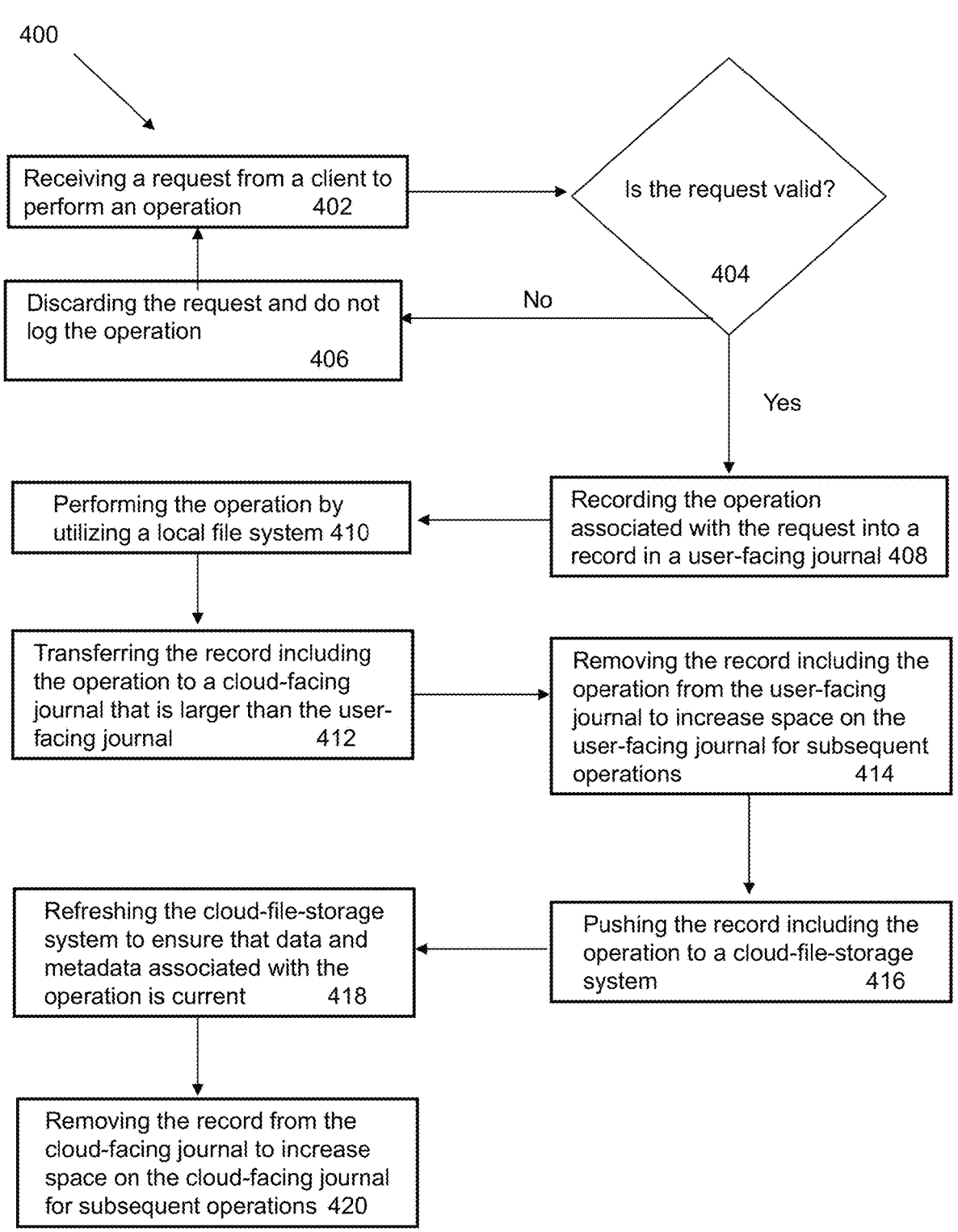

Receiving a request from a client to perform an operation    402

Is the request valid?    404

No

Discarding the request and do not log the operation    406

Yes

Recording the operation associated with the request into a record in a user-facing journal 408

Performing the operation by utilizing a local file system 410

Transferring the record including the operation to a cloud-facing journal that is larger than the user-facing journal    412

Removing the record including the operation from the user-facing journal to increase space on the user-facing journal for subsequent operations    414

Refreshing the cloud-file-storage system to ensure that data and metadata associated with the operation is current    418

Pushing the record including the operation to a cloud-file-storage system    416

Removing the record from the cloud-facing journal to increase space on the cloud-facing journal for subsequent operations 420

SYSTEM AND METHODS FOR EFFECTIVELY ADDRESSING FAST-PRODUCER AND SLOW-CONSUMER PROBLEM FOR PERSISTENT HYBRID CLOUD CACHES

CROSS REFERENCE TO RELATED APPLICATION

This application is a Continuation of U.S. patent application Ser. No. 17/167,824, entitled "System and Methods for Effectively Addressing Fast-Producer and Slow-Consumer Problem for Persistent Hybrid Cloud Caches", filed Feb. 4, 2021, which claims the benefit of U.S. Provisional Application No. 62/970,198, entitled "System And Method For Effectively Addressing Fast-Producer And Slow Consumer Problems For Persistent Hybrid Cloud Caches," filed Feb. 5, 2020, the disclosures of which are incorporated, in their entirety by reference.

FIELD OF THE INVENTION

The present application relates to cloud technologies, data storage technologies, synchronization technologies, caching technologies, journaling technologies, and more particularly, to a system and method for effectively addressing the fast-producer and slow-consumer problem for persistent hybrid cloud caches.

BACKGROUND

Persistent caches serve as an important component of internet applications, as they help achieve better throughput and increased data access speeds. Conventionally, persistent caches persist data and metadata on a local file system. The integrity of the data stored in a persistent cache may be protected by implementing a journaling system. The journaling system may be a data storage location where records are added to represent operations performed by a user or by a computing system at the direction of a user, and the backing store for a journal may comprise disk blocks. Journals may also be referred as logs and the two terms are often used interchangeably. In descriptive logging, the operations are described in a way that uses as little storage space as possible. Currently, for practical reasons, journals cannot grow indefinitely and typically need to "wraparound". This means that it should be possible to overwrite old records, without the loss of data or metadata. The ability to overwrite in the case of a wraparound relies or is dependent on the fact the operations described by the journal records have reached their final destination, which for purposes of the present disclosure may comprise a cloud or remote server. When the records have reached a final destination, the records may be considered safe to be discarded (such as being deleted or removed) from a persistent cache. Notably, the ability to overwrite or recycle old records is tied to how fast or slow the consumer (e.g., the cloud or remote server) can consume records produced by clients. Unfortunately, a typical situation in such a system is that clients end up being rate-limited, which defeats the purpose of persistent caches by reducing their utility and the benefits they provide to other elements of a system. While current technologies and methodologies related to the use of persistent caches provide for benefits and efficiencies, such technologies and methodologies still have shortcomings. As a result, current methodologies and technologies require improvements in order to be capable of providing a more optimized and desired level of caching performance. Such enhancements and improvements to conventional methodologies and technologies may provide for improved efficiency, improved speed, improved caching capabilities, improved redundancy, improved long-term and short-term performance, reduced costs, and increased ease-of-use.

SUMMARY

A system, apparatuses, and accompanying methods for effectively addressing the fast-producer and slow-consumer problem for persistent hybrid cloud caches are disclosed. In some embodiments, the system, apparatuses, and methods overcome limitations of associated with current technologies by employing the use of two journals (or another multiple number of journals) of unequal sizes to a journaling system instead of using a single journal approach. Instead of a journaling system with one journal, the disclosed system, apparatuses, and methods provide for two journals which are referred to as a user or user-facing journal (meaning that user-initiated operations or actions are recorded in the journal) or "ulog" and a cloud or cloud-facing journal (meaning that it is capable of being used to transfer data to a cloud platform or system) or "clog". In some embodiments, the ulog, as its name implies, records the operations (including, as examples, data and metadata) for actions and operations performed by users and/or devices. Once these records are added to the ulog, the operations are considered guaranteed and complete. Before these records are reflected (i.e., copied to) to cloud storage, the records may be transferred using the system, apparatuses, and methods to a second larger journal, the clog. From the clog, the system, apparatuses, and methods may reflect the data and metadata generated by the operations to a remote or cloud-based server. Once a record gets transferred from the ulog to the clog, the record may be released from the ulog. This means that the probability of not finding space in the case of wraparounds is reduced, and it may be directly proportional to local disk performance. In some embodiments, the clog, on the other hand, may benefit from being relatively larger in size. In some embodiments, the clog's size may be inversely proportional to how fast the system and methods can push a record to cloud, i.e., the speed of the network. As a result, embodiments of the disclosed system, apparatuses, and methods disentangle a circular journal from issues arising due to a slow network, by adding an additional layer of a journal. (or, in some embodiments, multiple additional layers).

In one embodiment, a system for effectively addressing the fast-producer and slow-consumer problem for persistent hybrid cloud caches is provided. The system may include a memory that stores computer-executable instructions and an electronic processor that executes the instructions to perform various operations of the system. The system may perform an operation that includes recording, in a record of a user or user-facing log or journal, a function or operation to be conducted in the system. The system may proceed to transfer the record including the operation to a cloud or cloud-facing log or journal. In some embodiments, the cloud-facing journal may be configured to be larger and able to contain more data and data records than the user-facing journal. The system may perform an operation that includes removing the record from the user-facing journal once the record is transferred to the cloud-facing journal to increase available storage space on the user-facing journal for recording a subsequent operation. The system may then perform an operation that includes pushing (or otherwise transferring) the record from the cloud-facing journal to a cloud-filestorage system. Furthermore, the system may perform an operation that includes removing the record from the cloud-facing journal once the record is pushed to the cloud-file-storage system to increase available storage space on the cloud-facing journal.

In another embodiment, a method for effectively addressing the fast-producer and slow-consumer problem for persistent hybrid cloud caches is provided. The method may include utilizing a memory that stores a set of computer-executable instructions, and an electronic processor that executes the instructions to perform the various functions or operations of the method. The method may include recording, in a record of a user or user-facing log or journal, an operation to be conducted in a system. Additionally, the method may include transferring the record including the operation to a cloud or cloud-facing log or journal. In some embodiments, the cloud-facing journal may be configured to be larger and contains more data storage than the user-facing journal. The method may include deleting the record from the user-facing journal once the record is transferred to the cloud-facing journal to increase available space on the user-facing journal for recording a subsequent operation. Furthermore, the method may include pushing (or otherwise transferring) the record from the cloud-facing journal to a cloud-file-storage system. Moreover, the method may include deleting the record from the cloud-facing journal once the record is pushed to the cloud-file-storage system to increase available space on the cloud-facing journal.

According to yet another embodiment, a computer-readable device (such as a data storage medium) including computer-executable instructions for effectively addressing the fast-producer and slow-consumer problem for persistent hybrid cloud caches is provided. The computer-executable instructions, when executed by a programmed electronic processor, cause the processor or an apparatus including the processor to perform operations including: recording, in a record of a user or user-facing log or journal, an operation to be conducted in a system; transferring the record including the operation to a cloud or cloud-facing log or journal, wherein the cloud-facing journal is larger and contains more data storage than the user-facing journal; removing the record from the user-facing journal once the record is transferred to the cloud-facing journal to increase available space on the user-facing journal for recording a subsequent operation; and pushing (or otherwise transferring) the record from the cloud-facing journal to a cloud-file-storage system.

These and other features of the system, apparatuses, and methods for effectively addressing the fast-producer and slow-consumer problem for persistent hybrid cloud caches are described in the following detailed description, drawings, and appended claims.

BRIEF DESCRIPTION OF THE DRAWINGS

FIG. 4 is a flow chart or flow diagram illustrating an example of a method, operation, function or process for effectively addressing the fast-producer and slow-consumer problem for persistent hybrid cloud caches, in accordance with an embodiment of the present disclosure.

DETAILED DESCRIPTION OF THE DRAWINGS

A system 100 and accompanying methods for effectively addressing the fast-producer and slow-consumer problem for persistent hybrid cloud caches are disclosed. In particular, the system 100 and methods address a problem associated with conventional approaches by employing the use of two journals (or in some embodiments, a greater number of journals) of unequal sizes in a journaling system instead of using a single journal approach. Thus, in some embodiments, instead of a journaling system with one circular journal, the system 100 and methods provide for two journals, referred to as a user or user-facing log or journal, or "ulog" and a cloud or cloud-facing log or journal, or "clog". In some embodiments, the ulog, as its name implies, records the operations (typically in the form of data and metadata) performed by one or more of users, programs, systems, and devices. Once these data records are added to the ulog, the operations being performed are considered guaranteed and complete. Before these records are "reflected" (transferred) to a cloud platform or data storage, the records are transferred using the system 100 and methods to a second larger journal, the clog. From the clog, the system and methods reflect the operations to a cloud-based platform or data storage. When a record is transferred from the ulog to the clog, the record may be released from the ulog. This means that the problem of not finding sufficient storage space in the case of "wraparounds" is drastically reduced, and in some cases the reduction may be directly proportional to local disk performance. In some embodiments, the clog, on the other hand, may need to be comparatively larger in terms of data storage capacity or size. In some embodiments, the clog's size may be inversely proportional to how fast the system and methods can push or transfer a record to the cloud, i.e., the speed of the network. As a result, the system 100 and methods disentangle a circular journal from issues arising out of a slow network, such as by adding one more layer of a journal (or, in some embodiments, multiple additional layers).

Although user or user-facing and cloud or cloud-facing are used as descriptions or labels for the two types of logs or journals described herein, it should be understood that these are not to be taken as strict definitions of those elements. For example, user-facing as used herein refers to a log or journal that is used to record operations or actions of a user or client device and is capable of being used as part of a method or process to store data and metadata about such operations or actions. Similarly, cloud-facing as used herein refers to a log or journal that is capable of being used as part of a process or method to transfer data and metadata from that log or journal to a cloud-based data storage element or component (such as the cloud file system referred to herein).

Figure 1:
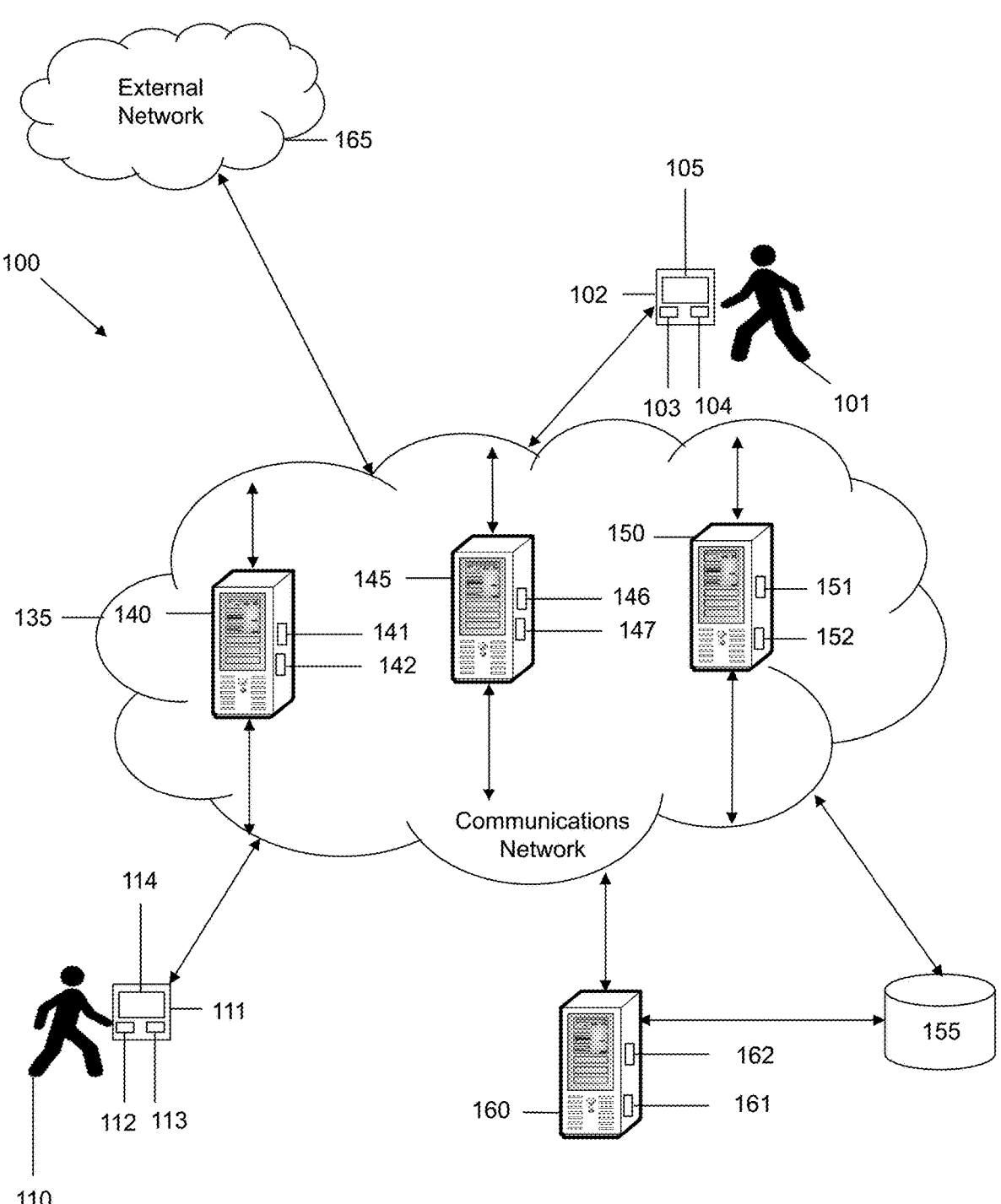
FIG. 1 is a schematic diagram of a system for effectively addressing the fast-producer and slow-consumer problem for persistent hybrid cloud caches, in accordance with an embodiment of the present disclosure.
Figure 2:
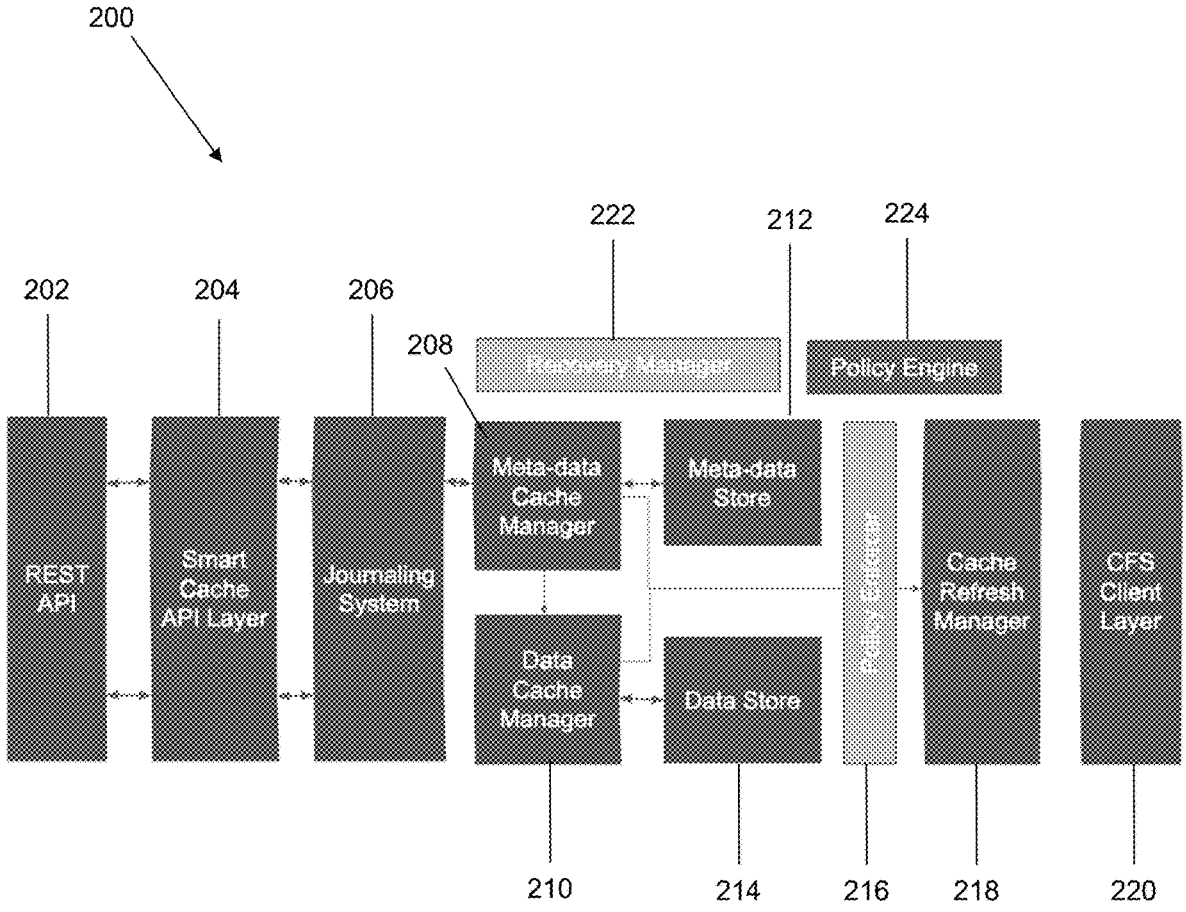
FIG. 2 is a schematic diagram illustrating a system including additional components for supporting the functionality of the system of FIG. 1, in accordance with an embodiment of the present disclosure.

As shown in FIG. 1, a system 100 for effectively addressing the fast-producer and slow-consumer problem for persistent hybrid cloud caches is disclosed. The system 100 may be configured to support, but is not limited to supporting, caching services, hybrid cloud services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and other computing applications and services. Notably, the system 100 may include a first user 101, who may utilize a first user device 102 to access data, content, and services, or to perform other tasks and functions. As an example, the first user 101 may utilize first user device 102 to transmit signals to access various online services and content, such as those available on an internet, on other devices, and/or on various computing systems. In some embodiments, the first user 101 may be an individual that seeks to conduct various operations on an application executing on the first user device 102 and/or on other devices of the system 100. For example, the first user 101 may want to store various data about the user in the system 100. In some embodiments, the first user 101 may be a robotic device, a computing device, a system, a program, a process, a humanoid, an animal, a type of user, or a combination thereof. The first user device 102 may include an electronic memory 103 that includes computer-executable instructions stored on or in the memory, and an electronic processor 104 that executes the instructions to perform the various operations and functions that are performed by the first user device 102. In some embodiments, the processor 104 may be implemented as hardware, software, or a combination thereof. The first user device 102 may include an interface 105 (e.g., a screen, monitor, graphical user interface, etc.) that may enable the first user 101 to interact with various applications executing on the first user device 102 and to interact with the system 100. In some embodiments, the first user device 102 may be and/or may include a computer, any type of sensor, a laptop, a set-top-box, a tablet device, a phablet, a server, a mobile device, a smartphone, a smart watch, or other type of computing device. Illustratively, and for purposes of an example, the first user device 102 is shown as a smartphone device in FIG. 1.

In addition to the first user 101, the system 100 may also include a second user 110, who may utilize a second user device 111 to perform a variety of functions. For example, the second user device 111 may be utilized by the second user 110 to transmit signals to request various types of content, services, and data provided by content and service providers associated with the communications network 135 or any other network in the system 100. In some embodiments, the second user 110 may be an individual that seeks to conduct various operations on an application executing on the second user device 111 and/or on other devices of the system 100. For example, the second user 110 may want to store various data received as inputs into an application of the system 100. In further embodiments, the second user 110 may be a robotic device, a computing device, a system, a program, a process, a humanoid, an animal, a type of user, or a combination thereof. The second user device 111 may include an electronic memory 112 that includes computer-executable instructions stored on or in the memory, and an electronic processor 113 that executes the instructions to perform the various operations and functions that are performed by the second user device 111. In some embodiments, the processor 113 may be implemented as hardware, software, or a combination thereof. The second user device 111 may include an interface 114 (e.g., a screen, monitor, graphical user interface, etc.) that may enable the second user 110 to interact with various applications executing on the second user device 111 and to interact with the system 100. In some embodiments, the second user device 111 may be a computer, a laptop, a set-top-box, a tablet device, a phablet, a server, a mobile device, a smartphone, a smart watch, or any other type of computing device. Illustratively, and for purposes of an example, the second user device 111 is shown as a computing device in FIG. 1.

In some embodiments, the first user device 102 and/or the second user device 111 may have a number of software applications stored thereon and/or application services stored on or otherwise accessible to them. For example, the first user device 102 and/or the second user device 111 may include cloud-based applications, database applications, caching applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, other type of applications, one or more types of application services, or a combination thereof. In some embodiments, the software applications may support the functionality provided by the system 100 and methods described in the present disclosure. In some embodiments, the software applications and services may include one or more graphical user interfaces to enable the first and second users 101, 110 to readily interact with the software applications. The software applications and services may also be utilized by the first and second users 101, 110 to interact with a device in the system 100, a network in the system 100, or a combination thereof. In some embodiments, the first user device 102, the additional user devices, and/or the second user device 111 may include associated telephone numbers, device identities, or other identifiers to uniquely identify the first user device 102, the additional user devices, and/or the second user device 111.

The system 100 may also include a communications network 135. The communications network 135 may be under the control of a service provider, the first user 101, the second user 110, other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive information and data traversing the system 100. In some embodiments, the communications network 135 may include a number of servers, databases, or other components. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, other network, or a combination thereof. Illustratively, servers 140, 145, and 150 are shown as being included within communications network 135. In some embodiments, the communications network 135 may be part of a single autonomous system that is located in a particular geographic region or be part of multiple autonomous systems that span several geographic regions.

Notably, the functionality of the system 100 may be supported and executed by using a combination of the servers 140, 145, 150, and 160. The servers 140, 145, and 150 may reside in communications network 135; however, in some embodiments, the servers 140, 145, 150 may reside outside communications network 135. The servers 140, 145, and 150 may provide a server-as-a-service that performs the various operations and functions provided by the system 100. In some embodiments, the server 140 may include an electronic memory 141 that includes computer-executable instructions stored on or in the memory, and an electronic processor 142 that executes the instructions to perform various operations and functions that are performed by the server 140. The processor 142 may be implemented in the form of hardware, software, or a combination thereof. Similarly, the server 145 may include an electronic memory 146 that includes computer-executable instructions, and an electronic processor 147 that executes the instructions to perform the various operations and functions that are performed by the server 145. Furthermore, the server 150 may include an electronic memory 151 that includes computer-executable instructions, and an electronic processor 152 that executes the instructions to perform the various operations and functions that are performed by the server 150. In some embodiments, the servers 140, 145, 150, and 160 may be one or more of network servers, routers, gateways, switches, media distribution hubs, signal transfer points, service control points, service switching points, firewalls, routers, edge devices, nodes, computers, mobile devices, or any other suitable computing device, or a combination thereof. In some embodiments, the servers 140, 145, 150 may be communicatively linked to the communications network 135, to a network, to a device in the system 100, or to a combination thereof.

The database 155 of the system 100 may be utilized to store and relay information that traverses the system 100, cache content that traverses the system 100, store data about each of the devices in the system 100 and to perform other typical functions of a database. In some embodiments, the database 155 may be connected to (or reside within) the communications network 135, other network, or a combination thereof. In some embodiments, the database 155 may serve as a central repository for information associated with any of the devices and information associated with the system 100. Furthermore, the database 155 may include an electronic processor and memory or be connected to a processor and memory to perform the various operations associated with the database 155. In some embodiments, the database 155 may be connected to the firewall 125, the servers 140, 145, 150, 160, the first user device 102, the second user device 111, any devices in the system 100, any process of the system 100, any program of the system 100, any other device, a network, or a combination thereof.

The database 155 may store information and metadata obtained from the system 100, store data and metadata associated with operations requested in the system 100, store operations occurring in the system 100, store information associated with journals utilized in the system 100, store metadata and other information associated with the first and second users 101, 110, store user profiles associated with the first and second users 101, 110, store device profiles associated with a device in the system 100, store communications traversing the system 100, store user preferences, store information associated with a device or signal in the system 100, store information relating to patterns of usage relating to the user devices 102, 111, 115 and/or computing device 120, store information obtained from a network in the system 100, store device characteristics, store information relating to a device associated with the first or second user 101, 110, store information associated with the communications network 135, store information generated and/or processed by the system 100, store information for an operation and/or function of the system 100 disclosed herein, store information traversing the system 100, or a combination thereof. Furthermore, the database 155 may be configured to process queries sent to it by a device in the system 100.

The system 100 may include an external network 165. The external network 165 may be under the control of a different service provider than communications network 135, a designated user, a computer, another network, or a combination thereof. The external network 165 may be configured to communicate with communications network 135. For example, the communications network 135 may be utilized to communicate with the first user device 102 and to connect with other devices within or outside external network 165. Additionally, the external network 165 may be configured to transmit, generate, and receive information and data traversing the system 100. In some embodiments, the external network 165 may include a number of servers, databases, or other components. The external network 165 may include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, or a combination thereof. In some embodiments, the external network 165 may be part of a single autonomous system that is located in a particular geographic region or be part of multiple autonomous systems that span several geographic regions.

In some embodiments, the system 200 may be included within the system 100, it may be a separate system from system 100, and/or may be a subsystem of system 100. The system 200 may include, but is not limited to including (or required to include), a REST Application Programming Interface (API) 200 (or other API), a smart cache API layer 204 (or other API layer), a journaling system 206 (which may include user-facing and cloud-facing journals), a metadata cache manager 208, a data cache manager 210, a metadata store 212, a data store 214, a policy enforcer 216, a cache refresh manager 218, a cloud-file-storage client layer 220, a recovery manager 222, and a policy engine 224. The REST API 200 may serve as an interface between the first user device 102, second user device 111, and/or other devices and applications supporting the functionality of the system 100. The REST API 200 may be configured to receive API calls from clients (e.g., to access a cache and/or to perform other functions), such as first user device 102 and/or second user device 111. The smart cache API layer 204 may serve as an intermediary between the REST API 200 and the journaling system 206 and the other components of the system 100, such as, but not limited to, the cloud-file-storage system and/or other components and/or applications of the system 100.

With regards to policy engine 224, examples of policies that may be implemented by the engine include but are not limited to or required to include the following:

a) Storage Management policies (e.g., how much disk space should be used by the cache);

b) Caching policies—what should be cached, what part of cache should be updated and when; and c) Eviction policies—What should be evicted/removed from cache if there is a need to do so.

In some embodiments, one or more policies may be implemented in whole or in part by a rule-base, a trained machine learning model, or other decision process.

The journaling system 206 may include a user-facing journal (referred to as ulog herein) and a cloud-facing journal (referred to as clog herein). The user-facing journal may be configured to record operations (including data and metadata associated with the operations) performed by the system. The metadata may be information that describes the data and/or operations and what is in the data and/or the type of operation. In some embodiments, the user-facing journal may be a circular log, buffer, and/or other data structure. The cloud-facing journal maybe configured to be larger (i.e., have a greater data storage capacity) than the user-facing journal and may be configured to reduce the load on the user-facing journal. The cloud-facing journal may also be a circular log, buffer, and/or other data structure. In some embodiments, the user-facing journal may transfer records storing information associated with the operations to the cloud-facing journal. Once the records are transferred to the cloud-facing journal, the records may be deleted or overwritten on the user-facing journal. The journals may be utilized to ensure that the operations requested by clients are ultimately carried out and performed; in some embodiments, this may be possible even if the system 100 and/or system 200 crashes. Data and metadata associated with the operations may be managed by the data cache manager 210 and the metadata cache manager 208 respectively. In some embodiments, the records including the data and metadata may be stored in the data store 214 and the metadata store 212 respectively.

The system 200 may include a policy enforcer 216, which may be configured to enforce the policies and rules associated with the system 200 and/or system 100. The cache refresh manager 218 may be configured to refresh a cache in the system 100 and/or system 200. For example, the cache refresh manager 218 may be configured to ensure that data and/or metadata recently stored in a particular cache is current and/or accurate (i.e., not stale). The system 200 may include a cloud-file-storage system client layer 220, which may be utilized to facilitate providing the records associated with the operations from the cloud-facing journal to a cloud-file-storage system (e.g., a cloud system). Additionally, the system 200 may include a recovery manager 222, which may be configured to recover lost data and/or metadata and ensure that the integrity of the data in the journals and/or caches of the system 100 and/or system 200 is preserved. The system 200 may further include a policy engine 224, which may be configured to generate and/or conduct various operations associated with policies and/or rules to be utilized with the system 100 and/or system 200.

Figure 3:
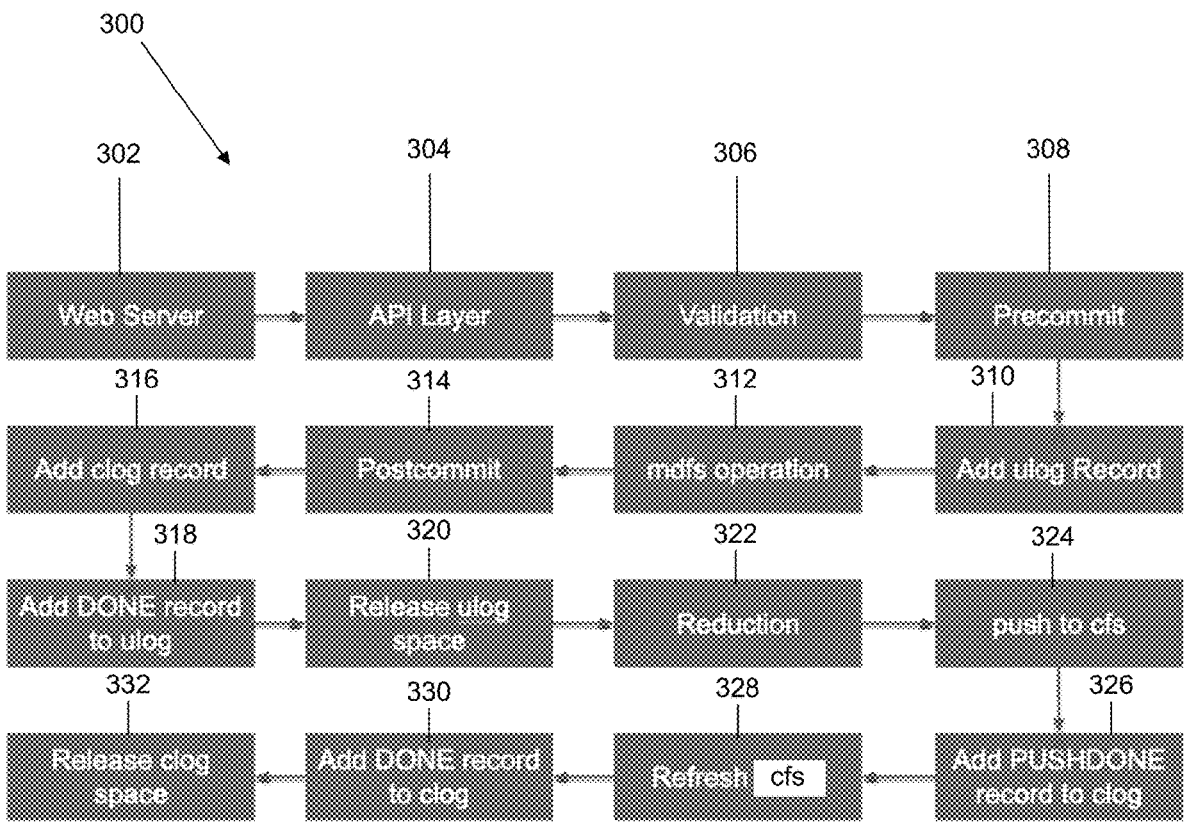
FIG. 3 is a schematic diagram illustrating various components and processes for supporting and providing the functionality of the system of FIG. 1, in accordance with an embodiment of the present disclosure.

The system 100 and/or system 200 may operate and/or execute the functionality as described in the present disclosure and according to the process flow 300 shown in FIG. 3. A user, such as first user 101, may seek to access a persistent cache and perform an operation (e.g., delete, write, push, and/or another operation), and may do so by initiating a REST API call/request via an application executing on the first user device 102. The request may reach a web server 302 of a hybrid cache device of the system 100 (e.g., server 140, server 145, server 150, etc.). The web server 302 may respond to the user to indicate whether the request was successful and may serve as the entry point for data operations to be conducted and/or recorded in the system 100 and/or system 200. The request may then move to the API layer 304, which may serve as an interface to access the functionality of the system 100 and/or system 200. At step, stage or element 306, the systems 100, 200 may conduct a validation test(s) to determine if the request is valid according to the rules or policies of the systems 100, 200 and/or if the paths (i.e., the path of the file system object being accessed or operated on; for example, a CREATE FOLDER operation may be defined using the operation "CREATE FOLDER" and the path "/shared/documents/disclosures") are valid. If the request is valid, then the systems 100, 200 may enter into a precommit phase 308, which may be utilized by the systems 100, 200 to determine an amount of resources of the systems 100, 200 that are expected to be required to process the operation associated with the request. Once the types and amount of resources (such as memory, a lock on a certain data structure, or space in a user journal) are reserved/acquired, the operation and data and/or metadata associated with the operation may be stored in a record within a user-facing journal at 310 (as suggested by "Add ulog record"). A local file system 312 (e.g., as indicated by the mdfs operation stage) may be configured to perform some or all of the operations associated with the request by using the acquired resources.

At step, stage or element 320, the systems 100, 200 may enter a postcommit phase, which may include determining that the performance of the operation(s) was successful, and which may also include deleting, removing, and/or retaking the resources utilized for conducting the operation. At 316, the record including the operation (and typically including information and/or metadata associated with the operation) may be transferred from the user-facing journal to a cloud-facing journal. At 318, a DONE record may be added to the user-facing journal now that the record has been transferred to the cloud-facing journal, and at, 320 the space (data storage) in the user-facing journal that was utilized to store the record may be released and the record may be removed from the user-facing journal to enable the space to be utilized for records of other operations. At 322, the systems 100, 200 may perform a reduction operation or function (e.g., in the event an object was created during the flow 300 and then deleted, this object and/or information associated with this object does not need to be sent to the cloud). At 324, the record including the operation (and any included information and/or metadata associated with the operation) may be transferred from the cloud-facing journal to a cloud-file-storage system for storage. In some embodiments, this may involve the record being "pushed" from the clog to the cloud-file-storage (cfs) system. In some embodiments, this may involve the record being "pulled" by the cfs upon receipt of a message indicating that the record is available for storage in the cfs. At 326, the systems 100, 200 may add a PUSHDONE record to the cloud-facing journal. At 328, the systems 100, 200 may refresh the cloud-file-storage (cfs) system to confirm/ensure that the record is in the cloud-file-storage system and that the data, information and/or metadata associated with the operation(s) is current. At 330, the systems 100, 200 may add a DONE record to the cloud-facing journal, and, at 332, the data storage space in the cloud-facing journal that was utilized to store the record may be released. Further, the records may be removed from the cloud-facing journal to enable the space to be utilized for records of other operations. Flow 300 may be repeated continuously and as often as needed to ensure proper storage of records of operations and their associated information and metadata. Notably, other use-case scenarios may be utilized with the system 100 and methods described herein.

As shown in FIG. 1, the system 100 may perform any of the operations, functions, processes or methods disclosed herein utilizing the processing capabilities of server 160, the storage capacity of the database 155, or other component of the system 100 to perform the functions, etc. The server 160 may include one or more processors 162 that may be configured to process any of the various functions of the system 100. The processors 162 may be implemented as software, hardware, or as a combination of hardware and software. Additionally, the server 160 may include a memory 161, which stores instructions that the processors 162 may execute to perform various operations of the system 100. For example, the server 160 may assist in processing loads handled by the various devices in the system 100, such as, but not limited to, receiving requests from clients to perform operations; determining if requests are valid and/or if the requests comply with rules of the system 100; discarding and/or preventing logging of operations; recording operations into a record of a user-facing journal or log; performing the operation associated with the request, such as by utilizing a local file system; transferring the record including the operation and/or information (and if relevant, metadata) associated with the operation to a cloud-facing journal or log; removing the record from the user-facing journal to increase the available space in the user-facing journal; pushing or otherwise transferring the record to a cloud file storage system; refreshing the cloud-file-storage system to ensure that data and metadata associated with the operation is current; removing the record from the cloud-facing journal to increase the available space in the cloud-facing journal for subsequent operations; and performing any other suitable or relevant operations conducted in the system 100. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100. In some embodiments, the server 160 may include any number of program modules, which may include software for conducting the various functions, operations, methods, and processes performed by the server 160.

Although FIGS. 1-5 illustrates specific example configurations of the various elements, components and functions of the system 100, the system 100 may include other configurations of the components, which may include using a greater or lesser number of the components and/or combining the functions of more than one component into a component. For example, the system 100 is illustratively shown as including a first user device 102, a second user device 111, a communications network 135, a server 140, a server 145, a server 150, a server 160, and a database 155. However, the system 100 may include multiple first user devices 102, multiple second user devices 111, multiple communications networks 135, multiple servers 140, multiple servers 145, multiple servers 150, multiple servers 160, multiple databases 155, or any number of other components inside or outside the system 100. Additionally, the system 100 may include any number of the elements, components or processes illustrated in FIGS. 2, 3, and 5 as well.

Furthermore, in some embodiments, substantial portions of the functionality and operations of the system 100 may be performed by other networks and systems that may be connected to system 100.

Notably, the system 100 may execute and/or perform the functions, operations, methods, or processes as described herein. An exemplary method 400 for effectively addressing the fast-producer and slow-consumer problem for persistent hybrid cloud caches is schematically illustrated in FIG. 4. The method 400 may include steps for utilizing user-facing and cloud-facing journals to record data and metadata associated with operations in a manner that is more efficient and reliable than existing technologies. To that end, at step or stage 402, the method 400 may include receiving a request from a client to perform an operation in the system 100. For example, the client may be the first user 101, the first user device 102, the second user 110, the second user device 111, or a combination thereof, and as an example, the client may want to have performed an operation that includes performing a mathematical calculation relating to various input data or storing obtained input data in the system 100. In some embodiments, the request may take the form of an API call, such as a REST API call, which may be received by the web server 302 of a hybrid cache device. In some embodiments, the receiving of the request may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device.

At step or stage 404, the method 400 may include determining whether the request is valid and if the request complies with the rules of the system 100. In some embodiments, the determining may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device. If the request is not valid or if the request does not comply with the rules of the system 100, then the method 400 may proceed to step 406, which may include discarding the request and/or not logging the operation associated with the request. In some embodiments, the discarding and/or not logging of the operation may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device. If, however, at step 404, the request is determined to be valid and complies with the rules of the system 100, the method 400 may proceed to step 408, which may include recording the operation associated with the request into a record of a user-facing journal or log (the "ulog") that may be configured to record operations conducted by users (or devices, programs, etc.). In some embodiments, the user-facing journal may be a circular log, other type of log, a type of buffer, a type of data structure suitable for providing journal functionality, or a combination thereof. In some embodiments, the recording of the operation may include recording information identifying the operation, the parameters required to conduct the operation, metadata describing the operation itself, and/or a other relevant information. In some embodiments, the recording may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device.

Once the operation and/or information associated with the operation is recorded in a record of the user-facing journal, the method 400 may include, at step 410, performing the operation. For example, the operation may be performed by using a local file system of the system 100. In some embodiments, the operation may be performed and/or facilitating by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device. At step 412, the method 400 may include transferring the record including the operation and/or information associated with the operation to a cloud-facing journal or log (the "clog"). In some embodiments, the cloud-facing journal may be configured to be larger (i.e., to have a greater data storage capacity) than the user-facing journal. In some embodiments, the clog may be configured to have a capacity that is inversely proportional to the rate at which the record may be pushed to the cloud (i.e., the speed of the communications network 135 and/or external network 165). In some embodiments, the cloud-facing journal may be a circular log, other type of log, a type of buffer, a type of data structure suitable for providing journal functionality, or a combination thereof. In some embodiments, the transfer of the record from the user-facing journal to the cloud-facing journal may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device.

At step 414, the method 400 may include removing the record including the operation and/or information associated with the operation from the user-facing journal to increase the available space on the user-facing journal for subsequent operations, such as those associated with subsequent requests. In some embodiments, the removal of the record from the user-facing journal may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device. At step 416, the method 400 may include pushing or otherwise transferring the record including the operation and/or information associated with the operation to a cloud-file-storage system (e.g., "cfs") for storage. In some embodiments, the pushing or transferring of the record to the cloud-file-storage system may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device.

At step 418, the method 400 may include refreshing the cloud-file-storage system to ensure that the data and meta-data associated with the operation is current and/or accurate. For example, the refreshing may comprise pulling and examining/comparing data from the cloud-file-storage system to ensure that the data and metadata is current. In some embodiments, refreshing of the cloud-file-storage system may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device. At step 420, the method 400 may include removing the record including the operation and/or information associated with the operation from the cloud-facing journal to increase the available space on the cloud-facing journal for subsequent operations, such as those associated with subsequent requests entering the system 100. In some embodiments, the removing of the record may be performed and/or facilitated by utilizing the first user device 102, the second user device 111, the server 140, the server 145, the server 150, the server 160, the communications network 135, the external network 165, any components of FIGS. 1-5, any combination thereof, or by utilizing any other appropriate program, network, system, or device. The method 400 may continuously operate as additional requests associated with additional operations are received by the system 100. The method 400 may further incorporate any of the features and functionality described for the system 100, any other method disclosed herein, or as otherwise described herein.

The systems and methods disclosed herein may include further functionality and features. For example, the operative functions of the system 100 and disclosed method(s) may be configured to execute on a special-purpose processor specifically configured to carry out the functions provided by the system 100 and the associated methods. The operative features and functionality provided by the system 100 and disclosed method(s) may be used to increase the efficiency of the computing devices being utilized by the system 100. For example, by training a model of the system 100 over time based on the data, metadata, operations, and/or other information provided and/or generated in the system 100, it may be possible to reduce the amount of computer operations that need to be performed by the devices in the system 100 using the processors and memories of the system 100, as compared with conventional approaches. In such a context, less processing power needs to be utilized because the processors and memories do not need to be dedicated for that processing. As a result, there are substantial savings in the usage of computer resources by utilizing the software, techniques, and algorithms provided in the present disclosure. In some embodiments, functionality of the system 100 may be configured to execute on one or more graphics processors and/or application specific integrated processors.

Notably, in some embodiments, various functions and features of the system 100 and methods may operate without human intervention and may be conducted entirely by computing devices. In some embodiments, for example, numerous computing devices may interact with devices of the system 100 to provide the functionality supported by the system 100. Additionally, in some embodiments, the computing devices of the system 100 may operate continuously and without human intervention to reduce the possibility of errors being introduced into the system 100. In some embodiments, the system 100 and methods may also provide effective computing resource management by utilizing the features and functions described in the present disclosure. For example, in some embodiments, upon receiving requests to perform operations and/or record information associated with operations, a device in the system 100 may transmit a signal to a computing device receiving or processing the requests, operations, and/or other data indicating that only a specific quantity of computer processor resources (e.g., processor clock cycles, processor speed, etc.) may be devoted to processing and/or recording the operations, information, and/or other data, and/or other operation conducted by the system 100, or a combination thereof. For example, the signal may indicate a number of processor cycles of a processor that may be utilized to record information associated with the operations, and/or specify a selected amount of processing power that may be dedicated to any of the operations performed by the system 100. In some embodiments, a signal indicating a specific amount of computer processor resources or computer memory resources that may be utilized for performing an operation of the system 100 may be transmitted from the first and/or second user devices 102, 111 to the various components of the system 100.

In some embodiments, a device in the system 100 may transmit a signal to a memory device to cause the memory device to dedicate a selected amount of memory resources to the various operations of the system 100. In some embodiments, the system 100 and methods may also include transmitting signals to processors and memories to perform the operative functions of the system 100 and methods at time periods when usage of processing resources and/or memory resources in the system 100 is at a selected value. In some embodiments, the system 100 and methods may include transmitting signals to the memory devices utilized in the system 100, which indicate specific sections of the memory that should be utilized to store the data utilized or generated by the system 100. The signals transmitted to the processors and memories may be utilized to optimize the usage of computing resources while executing the operations conducted by the system 100. As a result, such functionality provides substantial operational efficiencies and improvements over existing technologies.

Figure 5:
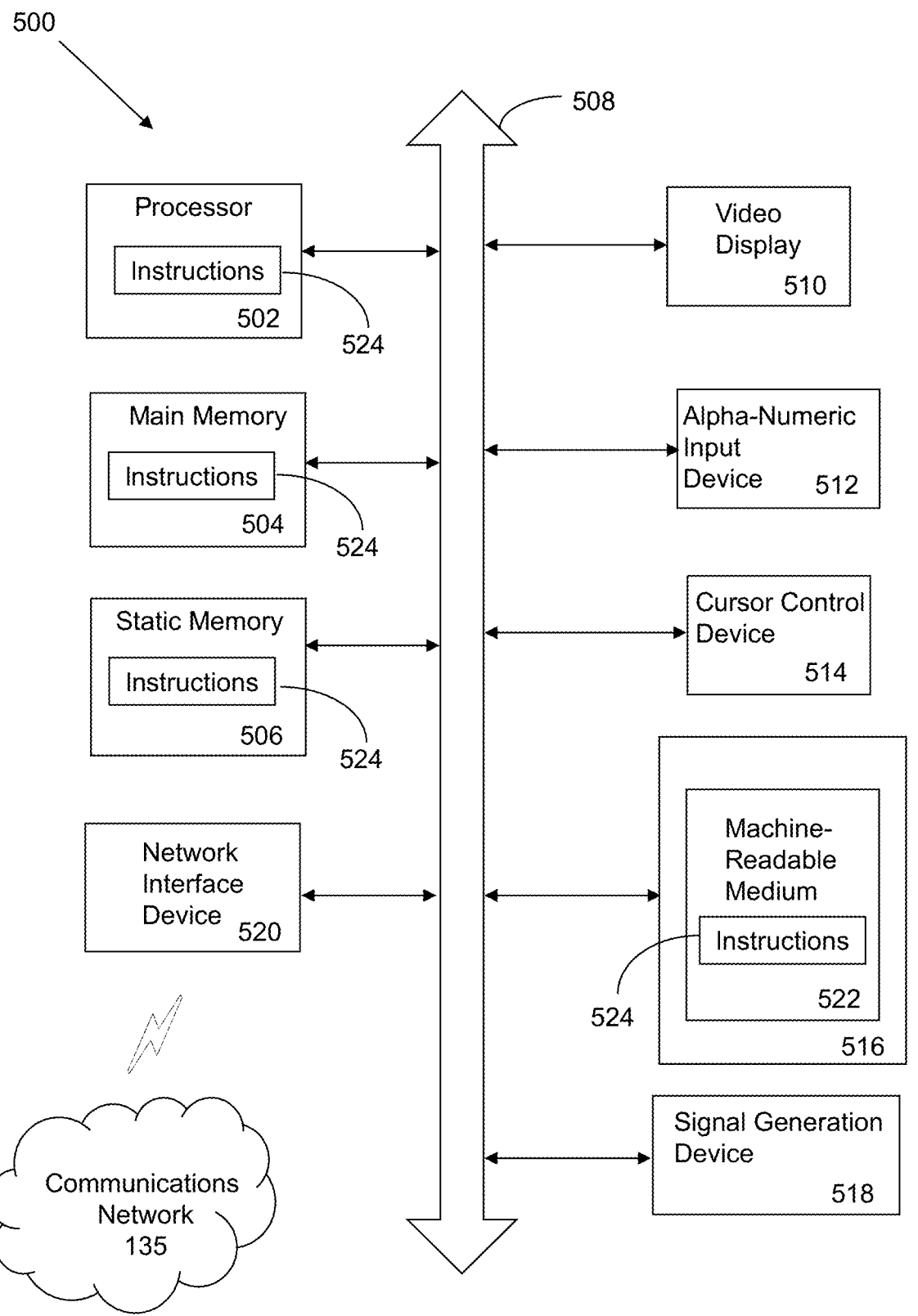
FIG. 5 is a schematic diagram of a machine or apparatus in the form of a computer system within which a set of computer-executable instructions, when executed, cause the machine or apparatus to perform one or more of the methods, functions, processes, or operations of the systems and methods for effectively addressing the fast-producer and slow-consumer problem for persistent hybrid cloud caches described herein.

Referring now to FIG. 5, at least a portion of the methodologies and techniques described with respect to the exemplary embodiments of the system 100 may incorporate a machine, such as, but not limited to, computer system 500, or other computing device within which a set of instructions, when executed, may cause the machine to perform one or more of the operations, methods, processes, or functions discussed herein. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with other operations conducted by or within the system 100.

In some embodiments, the machine may operate as a standalone device. In some embodiments, the machine may be connected (e.g., using communications network 135, another network, or a combination thereof) to, and assist with, operations performed by other machines and systems, such as, but not limited to, the first user device 102, the second user device 111, the server 140, the server 145, the server 150, the database 155, the server 160, the external network 165, the REST API 202, the smart cache API layer 204, the journaling system 206, the metadata cache manager 208, the data cache manager 210, the metadata store 212, the data store 214, the policy enforcer 216, the cache refresh manager 218, the cloud file storage system 220, the recovery manager 222, the policy engine 224, the components of FIGS. 1-5, other system, program, and/or device, or a combination thereof. The machine may be connected with a component or element of the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or a machine capable of executing a set of instructions (sequential or otherwise) that specify actions to be taken by that machine. Further, while a single machine is illustrated, the term "machine" shall also be taken to include a collection of machines that individually or jointly execute a set (or multiple sets) of instructions to perform one or more of the operations, methods, processes, or functions discussed herein.

The computer system 500 may include an electronic processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid-state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of computer-executable instructions 524, such as, but not limited to, software for use in implementing one or more of the operations, methods, processes, or functions described herein, including those methods illustrated and described with reference to FIGS. 1-4. The instructions 524 may also reside, completely or at least partially, within the main memory 504, the static memory 506, or within the processor 502, or a combination thereof, during execution thereof by the computer system 500. The main memory 504 and the processor 502 may include machine-readable media.

Dedicated hardware implementations including, but not limited to, application specific integrated circuits, programmable logic arrays and other hardware devices can likewise be constructed to implement the methods described herein. Applications or uses that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on or being executed by an electronic processor such as found in a computing device. Furthermore, software implementations can include, but are not limited to, distributed processing or component/object distributed processing, parallel processing, or virtual machine processing which can be constructed to implement the methods described herein.

The present disclosure contemplates a machine-readable medium 522 containing instructions 524 so that a device connected to the communications network 135, another network, or a combination thereof, can send or receive voice, video or data, and communicate over the communications network 135, another network, or a combination thereof, using the instructions. The instructions 524 may further be transmitted or received over the communications network 135, another network, or a combination thereof, via the network interface device 520.

While the machine-readable medium 522 is shown in an example embodiment to be a single medium, the term "machine-readable medium" should be understood to include a single medium or multiple media (e.g., a centralized or distributed database, and/or associated caches and servers) that store the one or more sets of instructions. The term "machine-readable medium" should also be understood to include any medium that is capable of storing, encoding or carrying a set of instructions for execution by a machine and that causes the machine to perform one or more of the operations, methods, processes, or functions described in the present disclosure.

The present disclosure includes the following clauses:

Clause 1. A system, comprising:
a non-transitory memory containing a set of computer-executable instructions; and
an electronic processor configured to execute the set of instructions, wherein when executed, the instructions cause the system to
store, in a record of a user journal, data regarding an operation to be performed in the system;
transfer the record to a cloud journal, wherein the cloud journal has a larger storage capacity than the user journal;
remove the record from the user journal once the record is transferred to the cloud journal;
transfer the record from the cloud journal to a cloud-file-storage system; and
remove the record from the cloud journal once the record is transferred to the cloud-file-storage system.

Clause 2. The system of clause 1, wherein storing data regarding the operation in the record of the user journal further comprises storing metadata associated with the data regarding the operation in the record.

Clause 3. The system of clause 1, wherein a size of the cloud journal is inversely proportional to a speed at which the record is able to be transferred to the cloud-file-storage system.

Clause 4. The system of clause 1, wherein the operations further comprise receiving, from a client of the system, a request from a client of the system to perform the operation.

Clause 5. The system of clause 4, wherein the operations further comprise determining whether the request is valid.

Clause 6. The system of clause 5, wherein the operations further comprise determining an amount of resources required to perform the operation.

Clause 7. The system of clause 6, wherein the operations further comprise utilizing, if the request is determined to be valid, a local file system to perform the operation in response to the request and after the operation is recorded in the record of the user journal.

Clause 8. The system of clause 7, wherein the operations further comprise determining if the performing of the operation was successful.

Clause 9. The system of clause 8, wherein the operations further comprise adding an operation completed record to the user journal.

Clause 10. The system of clause 1, wherein the operations further comprise refreshing the cloud-file-storage system to determine whether data and metadata associated with the operation are current.

Clause 11. A method, comprising:
storing, in a record of a user journal, data regarding an operation to be performed in a system;
transferring the record to a cloud journal, wherein the cloud journal has a larger storage capacity than the user journal;
removing the record from the user journal once the record is transferred to the cloud journal;
transferring the record from the cloud journal to a cloud-file-storage system; and
removing the record from the cloud journal once the record is transferred to the cloud-file-storage system.

Clause 12. The method of clause 11, further comprising facilitating performance of the operation if the system crashes.

Clause 13. The method of clause 11, further comprising storing metadata associated with the operation in the record.

Clause 14. The method of clause 11, further comprising adjusting one or more of a storage capacity of the cloud journal and a storage capacity of the user journal based on a requirement of one or more of the system and a requirement of a client system.

Clause 15. The method of clause 11, further comprising determining an amount of resources needed to perform the operation, and further comprising performing the operation using at least a portion of the determined amount of resources.

Clause 16. The method of clause 11, further comprising determining if a request associated with performing the operation complies with a rule or policy of the system.

Clause 17. The method of clause 16, further comprising rejecting the request if the request does not comply with the rule or policy of the system.

Clause 18. The method of clause 11, wherein one or more of the user journal and the cloud journal comprise circular logs.

Clause 19. The method of clause 11, further comprising implementing one or more of the user journal and the cloud journal on a persistent cache.

Clause 20. One or more non-transitory computer-readable media comprising instructions, which when executed by an electronic processor, cause the processor to perform operations comprising:
storing, in a record of a user journal, data regarding an operation to be performed in a system;
transferring the record to a cloud journal, wherein the cloud journal has larger storage capacity than the user journal;
removing the record from the user journal once the record is transferred to the cloud journal;
transferring the record from the cloud journal to a cloud-file-storage system; and
removing the record from the cloud journal once the record is transferred to the cloud-file-storage system.

In the context of the present disclosure, the terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives considered a medium substantially equivalent to a tangible storage medium. In some embodiments, the "machine-readable medium," "machine-readable device," or "computer-readable device" may be non-transitory. Accordingly, the disclosure is considered to include any one or more of a machine-readable medium or a distribution medium, as listed herein and including art-recognized equivalents and successor media, in which the instructions for software implementations may be stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures should be understood to be representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement capable of achieving the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:

one or more non-transitory computer-readable media containing a set of computer-executable instructions; and one or more electronic processors configured to execute the set of instructions, wherein when executed, the instructions cause the system to:

receive a request to perform an operation from a client that is part of the system;

store, in a record of a user journal on the client, metadata characterizing an operation to be performed in the system, wherein the metadata stored in the record of the user journal further comprises metadata characterizing an operation to be performed on a file or folder in the system;

determine that a request to perform the operation is valid and utilize a local file system to perform the operation in response to the request after the operation is recorded in the record of the user journal;

transfer the record to a cloud-facing journal on the local device and remove the record from the user journal after the record is transferred to the cloud-facing journal; and transfer the record from the cloud-facing journal to a remote cloud-file-storage and remove the record from the cloud-facing journal after the record is transferred to the remote cloud-file-storage.

2. The system of claim 1, wherein a size of the cloud-facing journal is inversely proportional to a speed at which the record is able to be transferred to the cloud-file-storage.

3. The system of claim 1, wherein the instructions cause the system to determine whether the request to perform the operation is valid and reject the request if it is not valid.

4. The system of claim 3, wherein the instructions cause the system to determine an amount of resources required to perform the operation.

5. The system of claim 3, wherein the instructions cause the system to, if the request is determined to be valid, utilize a local file system to perform the operation in response to the request and after the operation is recorded in the record of the user journal.

6. The system of claim 5, wherein the instructions cause the system to determine if the performing of the operation in response to the request was successful.

7. The system of claim 6, wherein the instructions cause the system to add an operation completed record to the user journal if performing of the operation in response to the request was successful.

8. The system of claim 1, wherein the instructions cause the system to refresh the cloud-file-storage to determine whether data and metadata associated with one or more operations are current.

9. The system of claim 1, wherein the operation is one of a create folder, a delete folder, a rename folder, a rename file, a delete file, a write, a save, or a push to cloud.

10. A method, comprising:

receiving a request to perform an operation from a client that is part of the system;

storing, in a record of a user journal on a local device, metadata regarding an operation to be performed in a system, wherein the metadata stored in the record of the user journal further comprises metadata characterizing one or more aspects of the operation;

determining that the request to perform the operation is valid;

in response to determining that the request is valid, utilizing a local file system to perform the operation after the operation is recorded in the record of the user journal;

transferring the record to a cloud-facing journal on the local device;

removing the record from the user journal once the record is transferred to the cloud-facing journal;

transferring the record from the cloud-facing journal to a remote cloud-file-storage; and removing the record from the cloud-facing journal once the record is transferred to the remote cloud-file-storage.

11. The method of claim 10, further comprising facilitating performance of the operation if the system crashes.

12. The method of claim 10, further comprising adjusting one or more of a storage capacity of the cloud-facing journal and a storage capacity of the user journal based on a requirement of one or more of the system and a requirement of the local device.

13. The method of claim 10, further comprising determining an amount of resources needed to perform the operation and performing the operation using at least a portion of the determined amount of resources.

14. The method of claim 10, further comprising determining if a request to perform the operation complies with a rule or policy of the system and rejecting the request if the request does not comply with the rule or policy.

15. The method of claim 10, wherein one or more of the user journal and the cloud-facing journal comprise circular logs.

16. The method of claim 10, further comprising implementing one or more of the user journal and the cloud-facing journal using a persistent cache.

17. The method of claim 10, further comprising determining if the performing of the operation in response to the request was successful.

18. The method of claim 10, further comprising refreshing the cloud-file-storage to determine whether data and metadata associated with one or more operations are current.

19. One or more non-transitory computer-readable media comprising instructions, which when executed by one or more electronic processors, cause the processors to perform operations comprising:

receiving a request to perform an operation from a client that is part of the system;

storing, in a record of a user journal on a local device, metadata regarding an operation to be performed in a system, wherein the metadata stored in the record of the user journal further comprises metadata characterizing one or more aspects of the operation;

determining that the request to perform the operation is valid;

in response to determining that the request is valid, utilizing a local file system to perform the operation after the operation is recorded in the record of the user journal;

determining an amount of resources required to perform the operation, and performing the operation using a portion of determined amount of resources;

transferring the record to a cloud-facing journal on the local device;

removing the record from the user journal once the record is transferred to the cloud-facing journal;

transferring the record from the cloud-facing journal to a remote cloud-file-storage; and removing the record from the cloud-facing journal once the record is transferred to the remote cloud-file-storage.

20. The non-transitory computer-readable media of claim 19, wherein the instructions cause the processors to:

determining an amount of resources required to perform the operation, and performing the operation using a portion of determined amount of resources;

determine if the performing of the operation was successful;

add an operation completed record to the user journal if performing of the operation was successful; and refresh the cloud-file-storage to determine whether data and metadata associated with one or more operations are current.

* * * * *